United States Patent Office.

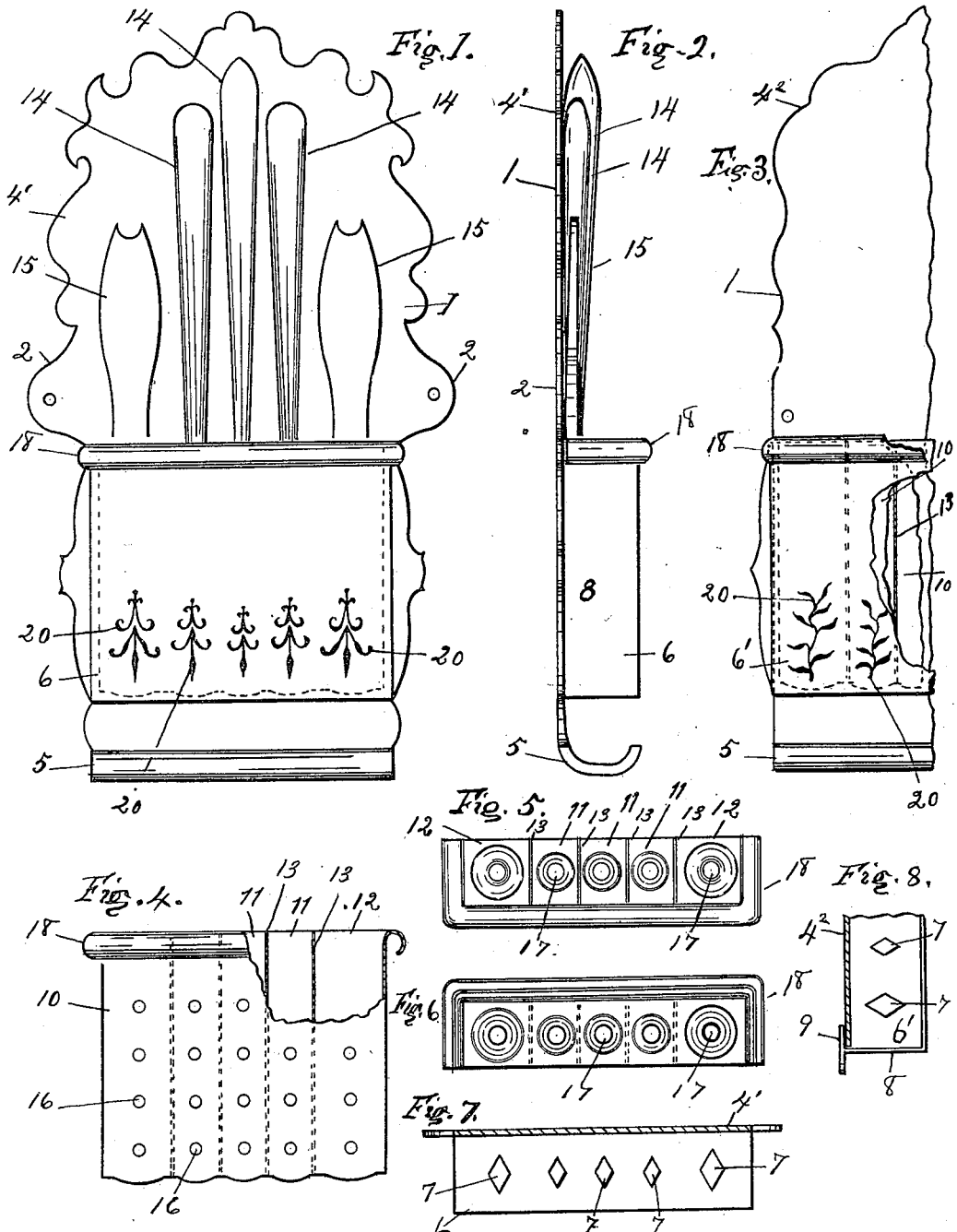

WALES E. VAN AME, OF FORT WAYNE, INDIANA.

BRUSH-HOLDER.

SPECIFICATION forming part of Letters Patent No. 670,069, dated March 19, 1901.

Application filed November 30, 1900. Serial No. 38,124. (No model.)

*To all whom it may concern:*

Be it known that I, WALES E. VAN AME, a citizen of the United States, residing at Fort Wayne, in the county of Allen, in the State of Indiana, have invented certain new and useful Improvements in Tooth-Brush Holders or Receptacles; and I do hereby declare that the following is a full, clear, and exact description of the invention, which will enable others skilled in the art to which it appertains to make and use the same, reference being had to the accompanying drawings, which form part of this specification.

My invention relates to improvements in tooth-brush holders or receptacles.

The primary object of my present invention is to provide a strictly sanitary tooth-brush holder having a removable receptacle provided with a series of perfectly drained and ventilated isolated compartments, one for each individual brush, whereby the said receptacle can readily and conveniently be detached for cleansing, and the perfect isolation of the brushes in clean individual compartments prevents the spread of disease-germs resulting from either the promiscuous contact of tooth-brushes used by different people or members of a family or from the usual unsanitary lodging-place of tooth-brushes.

My invention consists of a vertically-arranged holder provided upon its front face with an open-topped chamber having a perforated bottom and provided with a shallow drip-trough arranged directly beneath the said chamber and a detachable open-topped receptacle having a series of isolated vertical individual tooth-brush compartments having drainage-perforations in the bottom thereof.

The novel feature of my improvement resides in the construction and arrangement for securing isolation of and a sanitary lodgment for tooth-brushes in use.

In the accompanying drawings similar reference-numerals indicate like parts throughout the several views, in which—

Figure 1 is a front view of my improvement, showing the relative arrangement of the different parts and also showing three tooth-brushes and two nail-brushes in position therein. Fig. 2 is a side view of the same. Fig. 3 is a front view of a modified form of my improvement in which the containing-chamber is made detachable by slipping it over the upper end of the holder longitudinally. Fig. 4 is a detail front view of the removable chambered receptacle broken away in part to show the brush-compartments and also showing the lateral openings for ventilation in the front part thereof. Fig. 5 is a plan view of the same, showing the overhanging rim and the drainage-opening in the bottom. Fig. 6 is a bottom plan of the same. Fig. 7 is a bottom plan of the receptacle-containing chamber, with the drip-trough cut away, showing the drainage-openings in the bottom thereof. Fig. 8 is a detail showing a modified construction of the receptacle-containing chamber when it is made detachable.

My improvement may be made of any suitable material, preferably of porcelain, with the removable chambered receptacle made of glass, though all parts of my invention may be made of aluminium or other suitable sheet metal, if desired.

The holder 1 consists of a vertical back 4', whose upper and lateral edges may be of any desired contour and may be ornamented in any proper manner and is provided with a pair of oppositely-arranged apertured ears 2, by means of which the holder is secured to its support. These lateral ears are preferably arranged on the upper portion, as shown in Fig. 1, though obviously they may be omitted and the perforation 4 placed directly in the back 4' at or near the middle of its length.

The lower end of the holder 1 is provided with a forwardly-projecting horizontal transverse drip-trough 5, which is preferably integral with the said holder, as shown in Fig. 2.

On the front face of the holder 1, near its lower end and in coöperative relation with the said drip-trough, is arranged a vertical transverse chamber 6, open at its top and having its bottom provided with suitable drainage-openings 7, Fig. 7. The front face of this chamber 6 is preferably provided with openings 20 of ornamental design, as shown in Fig. 1, to aid the ventilation of the brush-receptacle. If desired, the front face of this chamber may be provided with any desired advertising matter, as of tooth-powder or the like. This chamber 6 may be made integral with the holder-body, as when made of porcelain or similar material, or it may be made detachable, as when made of sheet metal, (see 6', Fig. 3.) When this portion 6', Fig. 3, is made detachable, it may be secured in position in any suitable manner, as by providing the narrow sides 8 with a longitudinal flange 9, arranged in parallel relation with the front face thereof, Fig. 8, whereby it can be sprung into a holding engagement with the adjacent opposite edges of the holder 1 in a well-understood manner and as readily detached therefrom. If preferred, the vertical back 4² can be made of substantially a uniform width, Fig. 3, whereby the said portion 6' can be placed in position by slipping it over the upper end thereof. In this open-topped chamber 6 or 6' is loosely but snugly mounted the removable open-topped tooth-brush receptacle 10, divided into separate isolated compartments 11 and 12 by means of the vertical partitions 13, the compartments 11 being designed for individual tooth-brushes 14 and the compartments 12 for the nail-brushes 15, Fig. 1. Each of the compartments is perfectly ventilated by a series of openings 16 in the front face of the said receptacle 10 and is perfectly drained by a series of openings 17 in the bottom thereof. The bottom of these brush-compartments is preferably concave, as shown in Fig. 4, to facilitate the drainage thereof. The said openings 16 are in register with the said drainage-openings 17, which in turn are directly above the said drip-trough 5. The said receptacle 10 is preferably provided with an integral outwardly-turned rim 18 upon the three outer sides of its upper end, Fig. 5, and the said receptacle may be supported either by resting upon the bottom of the said chamber 6 or from the said rim 18, which may rest upon the upper edges of said chamber.

It is obvious that the mere contour and ornamentations of my improvement are immaterial and may be varied at pleasure and also that numerous modifications in mere details of construction may be made without departing from the scope of my invention.

The manner of employing my invention thus described is apparent and, briefly stated, is as follows: When the brushes are placed in position each in its individual isolated compartment and out of contact with each other or with any other unsanitary surface or objects, the danger of communicating disease-germs thereby is greatly lessened. As the brush-compartments are perfectly drained and ventilated, the brushes will be better preserved and their sanitary condition improved.

As the brush-receptacle is conveniently removable for cleansing or scalding, its sanitary condition under proper care is also insured.

Having thus described my invention and the manner of employing the same, what I desire to secure by Letters Patent is—

1. A sanitary tooth-brush holder consisting of a plate having a transverse chamber upon its outer face and a removable brush-receptacle mounted in the said chamber and provided with isolated compartments for the individual brushes.

2. A sanitary tooth-brush holder consisting of a plate having upon its lower end a drip-trough, and provided upon its outer face with an open-topped chamber having drainage-openings in coöperative relation with said trough; and a removable brush-receptacle provided with vertical compartments for the said brushes.

3. In a sanitary tooth-brush holder the combination of a vertical plate having a transverse horizontal drip-trough upon its lower extremity, and a vertical transverse chamber upon its front face having drainage-openings in the bottom thereof in coöperative relation with said trough; and a removable receptacle divided vertically into brush-compartments having drainage-openings in the bottom thereof, and adapted to be detachably mounted in the said chamber.

4. A brush-holder bracket or frame consisting of a plate having upon its lower end a horizontal drip-trough, and provided upon its front face with an open-topped chamber directly above the said trough; and a detachable brush-receptacle divided into a series of isolated brush-compartments having drainage-openings in the bottom thereof.

Signed by me at Fort Wayne, Allen county, State of Indiana, this 24th day of November, A. D. 1900.

WALES E. VAN AME.

Witnesses:
ADELAIDE KEARNS,
AUGUSTA VIBERG.